(12) United States Patent
D'Souza et al.

(10) Patent No.: US 10,569,734 B2
(45) Date of Patent: Feb. 25, 2020

(54) PASSENGER AIRBAG CHUTE CHANNEL WITH RADIAL RIB PATTERN

(71) Applicant: Ford Global Technologies LLC, Dearborn, MI (US)

(72) Inventors: Jude D'Souza, Beaumaris (AU); Tien Vo, Truganina (AU); Achuta Annedi, Glenroy (AU)

(73) Assignee: Ford Global Technologies LLC, Dearborn, MI (US)

( * ) Notice: Subject to any disclaimer, the term of this patent is extended or adjusted under 35 U.S.C. 154(b) by 126 days.

(21) Appl. No.: 15/951,631

(22) Filed: Apr. 12, 2018

(65) Prior Publication Data
US 2018/0304846 A1    Oct. 25, 2018

(30) Foreign Application Priority Data
Apr. 19, 2017   (CN) .......................... 2017 1 0257249

(51) Int. Cl.
| | |
|---|---|
| *B60R 21/217* | (2011.01) |
| *B60R 21/2165* | (2011.01) |
| *B60R 21/2342* | (2011.01) |
| *B60R 21/205* | (2011.01) |

(52) U.S. Cl.
CPC ........ *B60R 21/2176* (2013.01); *B60R 21/205* (2013.01); *B60R 21/2165* (2013.01); *B60R 21/2342* (2013.01)

(58) Field of Classification Search
CPC .............. B60R 21/2176; B60R 21/205; B60R 21/2342; B60R 21/2165
See application file for complete search history.

(56) References Cited

U.S. PATENT DOCUMENTS

| | | | |
|---|---|---|---|
| 5,904,366 A | 5/1999 | Nishijima et al. | |
| 6,152,479 A | 11/2000 | Wagener et al. | |
| 6,354,621 B1 | 3/2002 | Zimmerbeutel et al. | |
| 8,474,868 B2 | 7/2013 | Kalisz et al. | |
| 8,870,219 B1 * | 10/2014 | Roy ...................... | B60R 21/205 280/728.3 |
| 8,931,803 B2 | 1/2015 | Roychoudhury | |
| 2002/0005630 A1 * | 1/2002 | Suzuki ................ | B60R 21/2165 280/728.3 |
| 2004/0164525 A1 * | 8/2004 | Gray ..................... | B60R 21/216 280/728.3 |
| 2004/0174000 A1 * | 9/2004 | Speelman ............. | B60R 21/205 280/728.3 |
| 2005/0080605 A1 * | 4/2005 | Kong ................... | B60R 21/2165 703/8 |

(Continued)

OTHER PUBLICATIONS http://www.altairatc.com/india/previous-events/2008/09_OS_Design_Optimisation_of_Rib_Pattern_in_Airbag_Housing_Delphi_Automotive_Systems.pdf.

(Continued)

*Primary Examiner* — Darlene P Condra
(74) *Attorney, Agent, or Firm* — Vichit Chea; Kolitch Romano LLP

(57) ABSTRACT

An airbag assembly is provided to include a chute channel disposed between an instrument panel skin and an airbag module. The chute channel includes a base; and a plurality of radial ribs disposed on a surface of the base, extending from a middle portion to an edge of the base and configured to transfer forces from the airbag deployment towards a tear seam on the instrument panel skin.

16 Claims, 3 Drawing Sheets

(56) References Cited

U.S. PATENT DOCUMENTS

| | | | | |
|---|---|---|---|---|
| 2009/0066068 | A1* | 3/2009 | Kanno | B60R 21/205 |
| | | | | 280/741 |
| 2011/0221171 | A1* | 9/2011 | Bruyneel | B60R 21/2171 |
| | | | | 280/728.2 |
| 2012/0153601 | A1* | 6/2012 | Ohara | B60R 21/2032 |
| | | | | 280/730.2 |
| 2013/0001932 | A1* | 1/2013 | Kanno | B29C 65/06 |
| | | | | 280/728.3 |
| 2016/0075301 | A1* | 3/2016 | Kwasnik | B60R 21/2165 |
| | | | | 280/728.3 |
| 2018/0194319 | A1* | 7/2018 | Lesnik | B60R 21/215 |
| 2019/0100164 | A1* | 4/2019 | Citko | B60R 21/215 |
| 2019/0118756 | A1* | 4/2019 | Sterne Stroebe | B60R 13/0256 |

OTHER PUBLICATIONS

Design Optimization of Rib Pattern in Airbag Housing; Jul. 25, 2008; Paidela; J. et al.; http://www.altairatc.com/india/previous-events/2008/09__OS_Design_Optimisation_of_Rib_Pattern_in_Airbag_Housing_Delphi_Automotive_Systems.pdf.

* cited by examiner

PASSENGER AIRBAG CHUTE CHANNEL WITH RADIAL RIB PATTERN

RELATED APPLICATION

This application claims the benefit of Chinese Patent Application No.: CN 201710257249.4 filed on Apr. 19, 2017, the entire contents thereof being incorporated herein by reference.

FIELD

The present disclosure relates generally to an airbag assembly in vehicle, in particular, relates to an airbag assembly including passenger airbag chute channel with a radial rib pattern.

BACKGROUND

A passenger airbag is commonly used in a vehicle. In some vehicle designs, the passenger airbag may be attached to a cross car beam and interfaces with an instrument panel skin through an airbag chute channel. There are two weakened profiles or tear seams in the airbag assembly to enable deployment of the airbag, one at the airbag chute channel and one at the instrument panel skin. During a deployment event, the airbag pushes at the chute door, causing it to tear open, allowing the airbag to be fully deployed to protect the passenger. As airbag deployment happens within milliseconds, pushing upwards into the chute channel and getting the tear seam to open uniformly at the instrument panel skin are a challenging. The inventors have recognized that there exists a need for the airbag chute channel that transfers the force from the airbag deployment to the tear seam in an improved manner.

SUMMARY

According to one aspect of the present disclosure, an airbag chute channel disposed between an instrument panel skin and an airbag module comprises a base having a first section; and a plurality of radial ribs disposed on a surface of the base, wherein the plurality of ribs extend from a middle portion toward an edge of the base and are configured to transfer forces from airbag deployment towards a tear seam on the instrument panel skin.

In one embodiment, the plurality of radial ribs may be disposed to face the airbag module.

In another embodiment, the airbag chute channel may further comprise a plurality of first transverse ribs and a plurality of first vertical ribs, and the plurality of radial ribs intersect the plurality of first transverse ribs and the plurality of first vertical ribs.

In another embodiment, the base may further include a second section, and the second section only includes a plurality of second transverse ribs and a plurality of second vertical ribs. The plurality of second transverse ribs and the plurality of second vertical ribs intersect.

In another embodiment, at least a first pair of radial ribs may extend toward a first corner of the base and a second pair of radial ribs may extend toward a second corner of the base to increase stresses at the first and second corners at the tear seam during an airbag deployment.

According to another aspect, an airbag assembly in a vehicle comprises an airbag module; and an airbag chute channel disposed between an instrument panel skin and an airbag module. The chute channel may comprise a base having a first border at a first direction and a second border at a second direction substantially perpendicular to the first direction; and a plurality of first ribs and plurality of second ribs disposed on the base. The plurality of first ribs and second ribs are disposed at a surface facing the airbag module. The plurality of first ribs extend from a middle portion toward an edge at an angle with the first direction.

In one embodiment, the base may include a tear seam and the plurality of first ribs extend toward the tear seam.

In another embodiment, the end of each of the first ribs may contact the tear seam.

In another embodiment, the end portion of each of the first ribs is sloped down toward the tear seam of the base.

In another embodiment, the second ribs may include ribs substantially parallel to the first direction and ribs substantially parallel to the second direction.

In another embodiment, the base may include a first section adjacent to a passenger side and a second section, wherein the first section includes the first ribs and the second ribs and the second section of the base only includes the second ribs.

In another embodiment, an area of the first section may be more than half of an area of the base.

In another embodiment, the base and the first and second ribs may be made from plastic and integrally formed.

In another embodiment, at least a first pair of the first ribs may extend to a first corner of the tear seam and at least a second pair of the first ribs may extend to a second corner of the tear seam. The first and second corners are adjacent to the passenger side.

In another embodiment, the base may have a rectangular shape and may have four round corners.

According to another aspect, a vehicle may comprise an instrument panel skin including a tear seam for airbag deployment; and an airbag module to contain the airbag; and an airbag chute channel. The airbag chute channel includes a base having a tear seam corresponding to the tear seam in the instrumental panel, and a plurality of radial ribs and a plurality of U-shaped ribs or a plurality of semi-circular ribs disposed on a first section of the base. The plurality of radial ribs and the plurality of U-shaped ribs or the plurality of semi-circular ribs may be positioned at a surface facing the airbag module and spaced apart from the airbag module. The radial ribs extend from a middle portion toward the tear seam of the base and the U-shaped ribs or the semi-circular ribs have different sizes with one enclosing another, and each of U-shaped ribs or the semi-circular ribs has an opening toward a front of the vehicle. The U-shaped ribs or the semi-circular ribs intersect with the radial ribs. The plurality of radial ribs and the U-shaped ribs or the semi-circular ribs are configured to transfer forces from air bag deployment towards the tear seam of the airbag chute channel and the tear seam of the instrument panel skin.

In one embodiment, the base may further include a second section having only ribs substantially parallel to sides of the base, and wherein the first section is adjacent to a passenger side.

In another embodiment, the tear seam of the chute channel may be formed with a first round corner, a second round corner. At least a first pair of radial ribs extend to a first round corner and a second pair of the radial ribs extend to the second round corner.

In another embodiment, the plurality of radial ribs and the plurality of U-shaped ribs may be configured to create plastic strain on at least two corners of the base.

The chute channel having the radial rib pattern has some advantages. For example, the radial rib pattern of the chute channel can cause increased plastic strain on the corner portions of the tear seam during the airbag deployment so that the instrument panel skin can be torn open in an improved manner.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementation that solve any disadvantages noted above or in any part of this disclosure.

BRIEF DESCRIPTION OF THE DRAWINGS

Example embodiments will be more clearly understood from the following brief description taken in conjunction with the accompanying drawings. The accompanying drawing represent non-limiting, example embodiments as described herein.

It should be noted that these figures are intended to illustrate the general characteristics of methods, structure and/or materials utilized in certain example embodiments and to supplement the written description below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

The disclosed airbag assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various airbag assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1A:
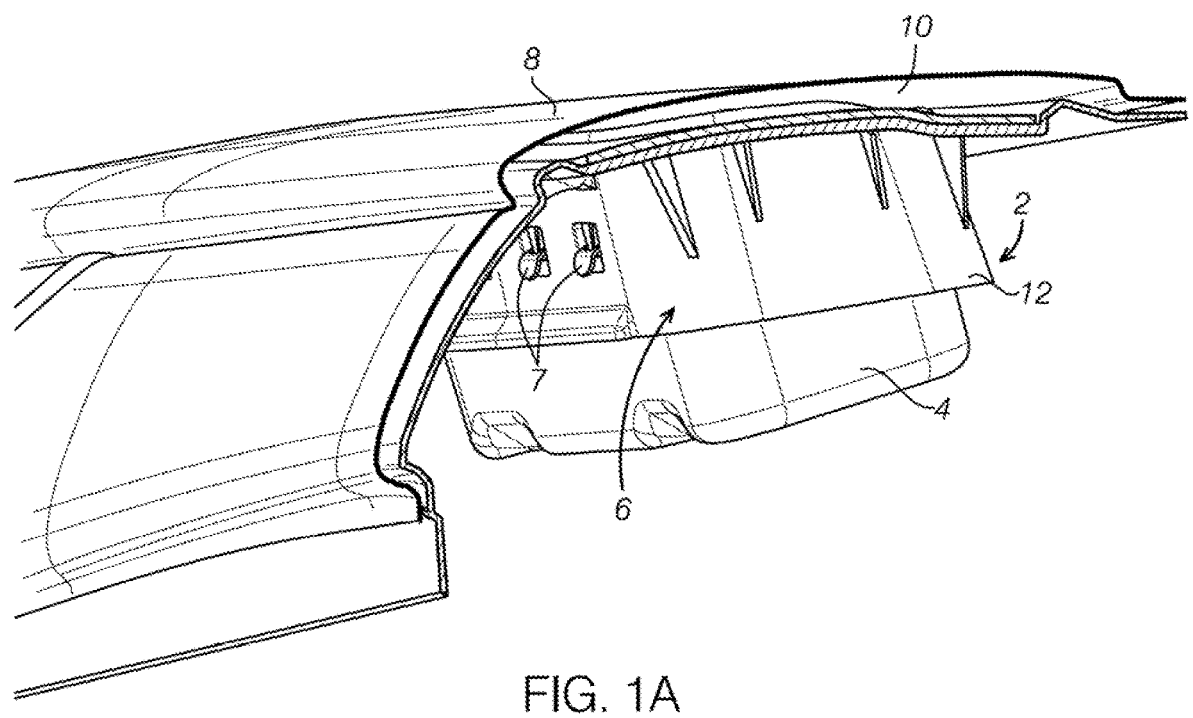
FIG. 1A is a perspective view of an example airbag assembly in which a chute channel of the present disclosure may be implemented, illustrating the airbag assembly is attached to an instrument panel skin.
Figure 1B:
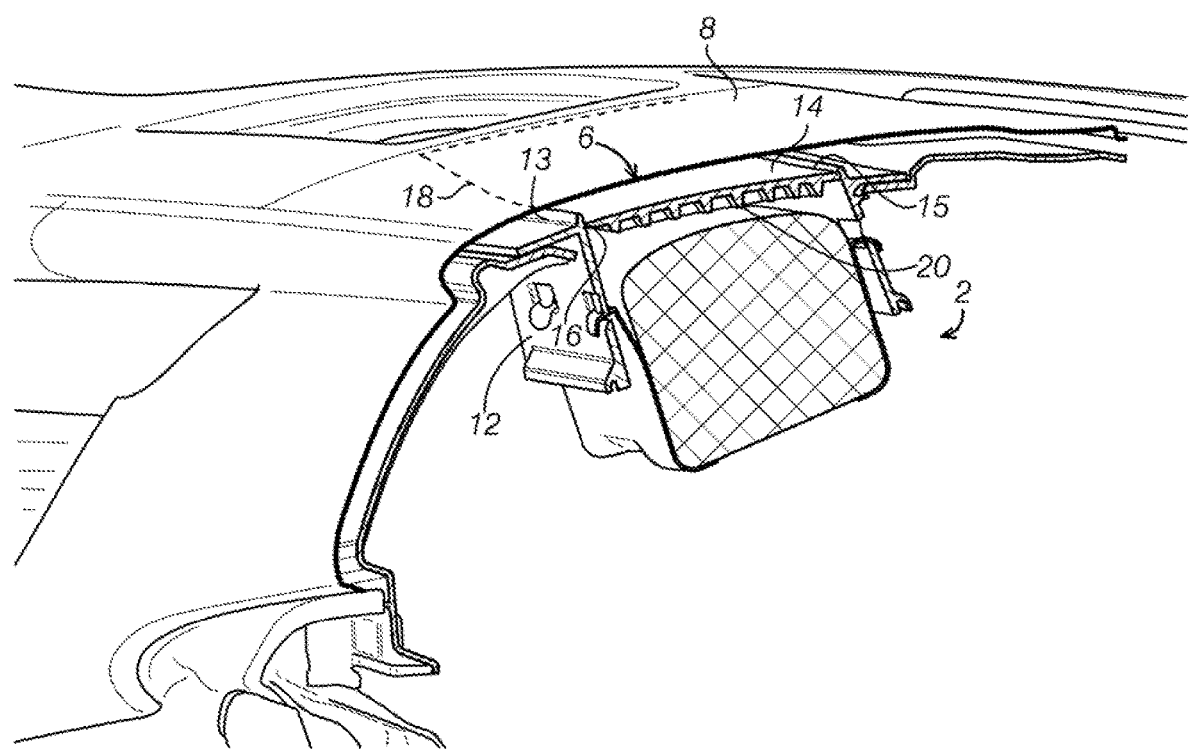
FIG. 1B is a perspective cross-sectional view of the airbag assembly in FIG. 1A.
Figure 1C:
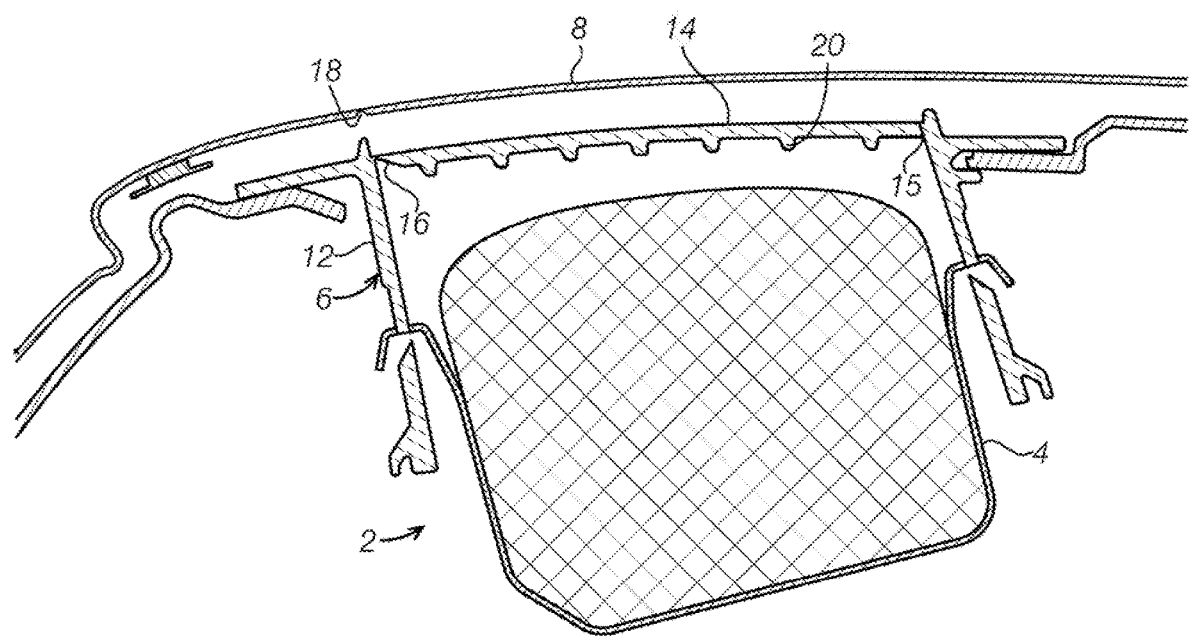
FIG. 1C is a cross-sectional view of the airbag assembly in FIG. 1A.

Referring to FIGS. 1A-1C, FIG. 1A is a perspective view of an example embodiment of an airbag assembly 2 in a vehicle according to one embodiment of the present disclosure. As shown in FIG. 1A, the airbag assembly 2 is attached to an instrument panel skin 8. FIG. 1B is a perspective cross-sectional view of the airbag assembly in FIG. 1B and FIG. 1C is a cross-sectional view of the airbag assembly in FIG. 1A. The airbag assembly 2 may include a passenger airbag module 4 and an airbag chute channel 6 or a chute channel 6. The passenger airbag module 4 is located on the instrument panel skin 8 in front of a front seat passenger. The airbag module 4 is attached to a cross car beam (not shown) and interfaces with the instrument panel skin 8 through the chute channel 6. That is, the chute channel 6 is disposed between the instrument panel skin 8 and the airbag module 4. The instrument panel skin 8 is typically made from synthetic plastic polymer such as polyvinyl chloride (PVC). A soft foam may be disposed in a space 10 between the chute channel 6 and the instrument panel skin 8. The airbag module 4 is configured to contain the airbag and the devices associated with deployment of the airbag. As shown in FIG. 1A, the airbag module 4 is received in the chute channel 6. The airbag module 4 may be connected to sidewalls 12 of the chute channel 6 via a plurality of connectors 7, for example. In the depicted embodiment, the sidewalls 12 surround the airbag module 4.

Figure 2:
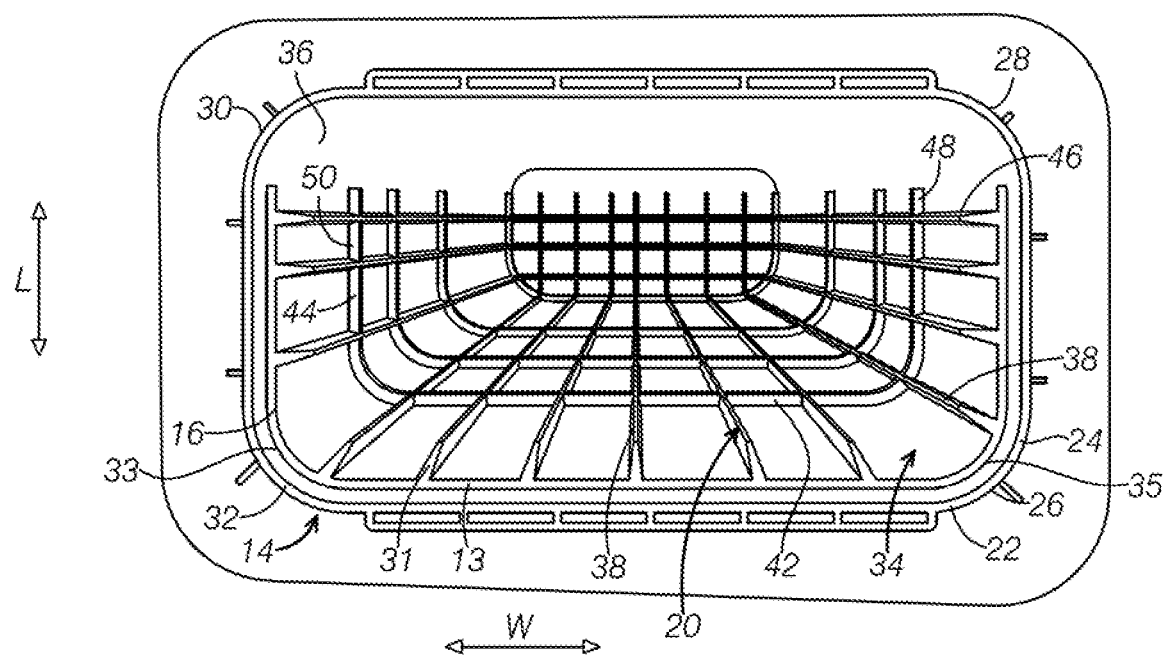
FIG. 2 is a perspective view of the chute channel, showing a rib pattern according to one embodiment of the present disclosure.

Referring to FIGS. 1B and 1C, the chute channel 6 may include a base 14 and the sidewalls 12. The sidewalls 12 of the chute channel 6 may extend substantially perpendicular from the base 14 and form a chamber to receive the airbag module 4. The base 14 may include a tear seam 16 corresponding to sides of an area covering the airbag module 4. With further reference to FIG. 2, in some embodiments, the tear seam 16 may have a U-shape on a surface of the base 14. A bottom side 13 of the U-shaped tear seam 16 is adjacent to the passenger. During the airbag deployment, the chute channel 6 is torn following the tear seam 16. A portion of the base defined by the tear seam 16 is opened like a door rotated around a side 15 which is opposite to the bottom side 13 and has no tear seam. Similarly, the instrument panel skin 8 may include a team seam 18. The tear seam 18 of the instrument panel skin 8 may be positioned at a place above the airbag module 4 or corresponding to the team seam 16 of the base 8. The tear seam 18 may have a U-shape, which is schematically shown in a dash line in FIG. 1B. It should be understood that the team seam 16 of the chute channel 6 may include a weakened portion with a thickness less than that of the main body of the base such that they would be broken off under a force. Similarly, the tear seam 18 of the instrument panel skin 8 is a weakened portion with a thickness less than that of the main body of the instrument panel. The tear seams 16 of the chute channel may be formed by any appropriate approaches known in the art such as formed in an injection molding, or formed at a second operation (e.g., laser or milling) after the injection molding. The tear seam 18 of the instrument panel skin 8 may be formed by any appropriate approaches known in the art such as milling with a knife blade after the slush molding process.

In some embodiments, the base 14 may include a plurality of ribs 20 positioned on a surface facing the airbag module 4. Such configuration of the ribs 20 is beneficial in the embodiment when the soft foam is disposed between the instrument panel skin 8 and the chute channel 6 as it is easier to dispose the soft foam. The plurality of ribs 20 may include different rib patterns configured to distribute the force from the airbag deployment to the tear seam effectively as described in detail below.

FIG. 2 is a perspective view of the chute channel 6 according to one embodiment of the present disclosure. The base 14 may have a first border 22 at a first direction W and a second border 24 at a second direction L substantially perpendicular to the first direction L. In some embodiments, the base 14 may have a rectangular shape, wherein the rectangular shape has a first round corner 32, a second round corner 26, a third round corner 30 and a fourth round corner 28. In some embodiments, the base 14 may have a first section 34 and a second section 36, each having different rib patterns. For example, the first section 34 may include a plurality of radial ribs 38. In some embodiments, the first section 34 of the base 14 may occupy more than half of a surface within the edge of the base 14. The first section 34 may be a section adjacent to a front seat passenger. In some embodiments, the radial ribs 38 of the first section 34 may extend from a middle portion toward the tear seam 16. The middle portion refers to a portion surrounding a center of the base 14. In some embodiments, the plurality of radial ribs 38 may extend to the tear seam 16, that is one end of a radial rib 38 contacts the tear seam 16. In some embodiments, an end portion 31 of the radial rib 38 may be sloped toward the tear seam 16 or is blended out. In some embodiment, some of the radial ribs 38 may extend from a center of one circle and some of the radial ribs 38 may extend from a center of different circles. In other words, the plurality of radial ribs 38 may extend from a middle portion of the base 14 toward the tear seam of the base 14 at an angle with the first direction W or the second direction L.

In some embodiments, the first section 34 of the base 14 may further include a plurality of first transverse ribs 42 and a plurality of first vertical ribs 44. The plurality of first transverse ribs 42 may be substantially parallel to the first direction W and the plurality of the vertical ribs 44 may be substantially parallel to the second direction L. The plurality of first transverse ribs 42 and the plurality of first vertical ribs 44 may intersect the plurality of radial ribs 38. In some embodiments, at least a first pair of the radial ribs 38 are extended toward or to the corner 32 that is adjacent to the front seat passenger and at least a second pair of the radial ribs are extended toward or to the corner 26 that is adjacent to the front seat passenger.

In some embodiments, the tear seam 16 of the chute channel 6 may be formed with a U-shape having a first round corner 33 and a second round corner 35. The first and the second corners 33, 35 of the tear seam 16 correspond to the first and second corners 32, 26 of the base 14 and are adjacent to the front seat passenger at an assembled position. At least a first pair of radial ribs extend to the first round corner 33 of the tear seam and a second pair of the radial ribs extend to the second round corner 35 of the tear seam.

In some embodiments, the second section 36 of the base 14 may further include a plurality of second transverse ribs 46 and a plurality of second vertical ribs 48. The second section 36 of the base 14 may include only transverse and vertical ribs. In some embodiments, the second section 36 may occupy less than half of the surface of the base 14.

In some embodiments, the plurality of ribs may include a plurality of U-shaped ribs 50. The U-shaped ribs 50 may be in different sizes with one enclosing another. In some embodiments, the U-shaped ribs 50 have openings toward a front of the vehicle 70 or have opening opposite to the front seat passenger. The plurality of U-shaped ribs 90 intersect the plurality of radial ribs 38. In some embodiments, the plurality of U-shaped ribs 50 may further intersect with the plurality of second transverse ribs 46. It should be appreciated that the U-shaped ribs 50 also refer to or include ribs with a semi-circular shape.

The plurality of ribs 20 may be formed with the base 14 integrally. For example, the plurality of ribs 20 and the base 14 may be formed in an injection molding. It should be understood that the plurality of ribs 20 are formed substantially on the surface of the base.

The chute channel with the radial rib pattern according to the present disclosure can transfer the force from the airbag deployment to the tear seam effectively and thus improve the tearing at the tear seam to facilitate the deployment of the airbag.

It should be appreciated that various configurations of the radial ribs are possible. For example, the radial ribs may extend from a middle portion of the base to the four sides of the base. In some embodiments, the rib patterns in the first section and the second section may be symmetric, that is, both the first and the second sections may include radial ribs. Depending on the size and configuration of the chute channel and the force of the airbag deployment, the distance between the ribs, the width and the height of the rib can vary.

Further, it should be appreciated that the chute channel may be used in the airbag assembly assembled in other locations of the vehicle which requires tearing of slush skin.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An airbag chute channel disposed between an instrument panel skin and an airbag module in an airbag assembly, comprising:
    a base;
    a plurality of radial ribs disposed on a surface of the base, wherein the plurality of radial ribs extend from a middle portion toward an edge of the base and are configured to transfer forces from airbag deployment towards a tear seam on the instrument panel skin; and
    a plurality of first transverse ribs and a plurality of first vertical ribs, wherein the plurality of radial ribs intersect the plurality of first transverse ribs and the plurality of first vertical ribs.

2. The airbag chute channel of claim 1, wherein the plurality of radial ribs is disposed to face the airbag module.

3. The airbag chute channel of claim 1, wherein the base includes a first section and a second section, wherein the plurality of radial ribs are disposed on the first section, and the second section only includes a plurality of second transverse ribs and a plurality of second vertical ribs, and wherein the plurality of second transverse ribs and the plurality of second vertical ribs intersect.

4. The airbag chute channel of claim 1, wherein at least a first pair of the plurality of radial ribs extend to a first corner of a tear seam of the base and a second pair of the plurality of radial ribs extend to a second corner of the tear seam of the base to increase stresses at the first and second corners of the tear seam of the base during an airbag deployment.

5. An airbag assembly in a vehicle, comprising:
an airbag module;
an airbag chute channel disposed between an instrument panel skin and the airbag module, including:
a base having a first border at a first direction and a second border at a second direction substantially perpendicular to the first direction; and
a plurality of first ribs and a plurality of second ribs disposed on the base, wherein the plurality of first ribs and the plurality of second ribs are disposed at a surface facing the airbag module and wherein the plurality of first ribs extend from a middle portion toward an edge at an angle with the first direction; and
wherein the base includes a tear seam and the plurality of first ribs extend toward the tear seam.

6. The airbag assembly of claim 5, wherein an end of each of the plurality of first ribs contact the tear seam.

7. The airbag assembly of claim 5, wherein at least a first pair of the first ribs extend to a first corner of the tear seam and at least a second pair of the first ribs extend to a second corner of the tear seam, and wherein the first and second corners are adjacent to a passenger side.

8. The airbag assembly of claim 5, wherein the second ribs include ribs substantially parallel to the first direction and ribs substantially parallel to the second direction.

9. The airbag assembly of claim 8 wherein the base includes a first section adjacent to a passenger side and a second section, wherein the first section includes the first ribs and the second ribs and the second section of the base only includes the second ribs.

10. The airbag assembly of claim 9, wherein an area of the first section is more than half of an area of the base.

11. The airbag assembly of claim 5, wherein the base and the plurality of first ribs and the plurality of second ribs are made from plastic and integrally formed.

12. The airbag assembly of claim 5 wherein the base has a rectangular shape and has four round corners.

13. A vehicle, comprising
an instrument panel skin including a tear seam for airbag deployment;
an airbag module to contain airbag; and
an airbag chute channel disposed between the instrument panel skin and the airbag module, wherein the airbag chute channel includes:
a base having a tear seam corresponding to the tear seam in the instrument panel skin, and
a plurality of radial ribs and a plurality of U-shaped ribs disposed on a first section of the base, facing the airbag module and spaced apart from the airbag module, wherein the radial ribs extend from a middle portion toward the tear seam of the base and the U-shaped ribs have different sizes with one enclosing another, and each of the plurality of U-shaped ribs has an opening toward a front of the vehicle, wherein the U-shaped ribs intersect with the radial ribs, and wherein the plurality of radial ribs and the U-shaped ribs are configured to transfer forces from an air bag deployment towards the tear seam of the airbag chute channel and the tear seam of the instrument panel skin.

14. The vehicle of claim 13, wherein the base further includes a second section having only a portion of the U-shaped ribs that are substantially parallel to sides of the base, and wherein the first section is adjacent to a passenger side.

15. The vehicle of claim 13, wherein the tear seam of the airbag chute channel forms a U shape with a first round corner and a second round corner, wherein at least a first pair of the plurality of radial ribs extend to the first round corner and a second pair of the plurality of radial ribs extend to the second round corner.

16. The vehicle of claim 13, wherein the plurality of radial ribs and the plurality of U-shaped ribs are configured to create plastic strain concentrated on the tear seam.

* * * * *